3,574,848
METHODS OF KILLING FUNGI WITH THE
DIESTER OF 2,2,4-TRIMETHYLPENTANEDIOL-1,3
Harald Schnegelberger, Hilden-Rhineland, and Horst Bellinger, Dusseldorf, Germany, assignors to Henkel & Cie GmbH, Dusseldorf-Holthausen, Germany
No Drawing. Filed June 11, 1968, Ser. No. 735,981
Claims priority, application Germany, June 22, 1967,
H 63,078
Int. Cl. A01n 9/24
U.S. Cl. 424—311                                                 4 Claims

ABSTRACT OF THE DISCLOSURE

Fungicidal compositions and method of killing fungi in which the active ingredient is a diester of 2,2,4-trimethyl-pentanediol-1,3 and aliphatic carboxylic acids of 2 to 12 carbon atoms.

PRIOR ART

The diacetate of propanediol-1,2 is described in Antimicrobial Agents Chemotherapy by Seneca et al., 1961, pp. 807–810, as being an effective fungicidal and bactericidal compound. However, the degree of fungicidal activity of this compound is such that it has to be used in comparatively high concentrations which are unsatisfactory for application to skin tissue.

OBJECTS OF THE INVENTION

It is an object of the invention to provide novel antifungal and antibacterial compositions which can be used safely on skin tissue.

It is another object of the invention to provide a novel method of killing fungi and bacteria.

These and other objects and advantages of the invention will become obvious from the following detailed description.

THE INVENTION

The novel fungicidal and bactericidal compositions of the invention are comprised of a safe but effective amount of at least one diester of 2,2,4-trimethylpentanediol-1,3 and aliphatic carboxylic acids of 2 to 12 carbon atoms and a major amount of a non-toxic carrier. Preferably, the compositions contain 0.0001 to 5.0%, especially 0.001 to 1.0%, by weight of the active ingredient.

The compositions may be in the form of any liquid, pasty or solid topical preparation such as aqueous suspensions, emulsions, solutions in organic solvents or oils, ointment, creams, soaps, sticks, powders, etc.

The aliphatic carboxylic acids for the diesters of 2,2,4-trimethylpentanediol-1,3 may be straight chain or branch chain or saturated or unsaturated. Examples of specific acids are acetic acid, propionic acid, butyric acid, isobutyric acid, n-valeric acid, isovaleric acid, caproic acid, enanthic acid, caprylic acid, pelargonic acid, capric acid, lauric acid, acrylic acid, crotonic acid, angelic acid, undecylenic acid, geranic acid, propiolic acid, etc. The preferred ester is the diacetate due to its very high degree of activity.

The said diesters may be made in any known fashion for preparing esters such as reacting 2,2,4-trimethylpentanediol-1,3 with an acid chloride in an organic solvent such as benzene in the presence of a tertiary amine such as pyridine or with an acid anhydride in the presence of an acid catalyst such as p-toluene sulfonic acid.

The method of the invention for killing fungi and bacteria comprises contacting fungi and bacteria with an effective amount of at least one diester of 2,2,4-trimethylpentanediol-1,3 and an aliphatic carboxylic acid of 2 to 12 carbon atoms. The said method is especially effective for topical application on skin tissue but may be used in other ways such as by washing clothes, floors, walls, etc. with compositions containing the said active ingredient.

In the following examples, there are described several preferred embodiments to illustrate the invention. However, it should be understood that the invention is not intended to be limited to the specific embodiments.

EXAMPLE I 0.2 mole of 2,2,4-trimethylpentanediol-1,3 and 0.8 mole of acetic acid anhydride in the presence of 0.2 gm. of p-toluenesulfonic acid as catalyst were heated for 5 hours at 120–130° C. Fractional distillation of the resulting product resulted in a 93% yield of the diacetate of 2,2,4-trimethylpentanediol-1,3 having a boiling point of 117° to 120° C. at 14 mm. Hg.

EXAMPLE II 0.2 mole of 2,2,4 - trimethylpentanediol - 1,3 and 0.6 mole of propionic acid anhydride were refluxed for 8 hours in the presence of 0.2 gm. of p-toluene sulfonic acid. Fractional distillation of the resulting product gave a 75% yield of the dipropionate of 2,2,4-trimethylpentanediol-1,3 having a boiling point of 131–132° C. at 14 mm. Hg.

EXAMPLE III 0.2 mole of 2,2,4-trimethylpentanediol-1,3 and 0.6 mole of butyric acid anhydride in the presence of 0.2 gm. of p-toluene sulfonic acid were refluxed for 8 hours. Fractional distillation of the product gave a 71% yield of the dibutyrate of 2,2,4-trimethylpentanediol-1,3 having a boiling point of 159–160° C. at 14 mm. Hg.

EXAMPLE IV

The threshold concentrations of the esters of Examples I to III were determined by the so-called plate test. This variation of the dilution test for chemical disinfectants set up by Deutsche Gesellschaft für Hygene and Mikrobiologie has the advantage of using a solid culture media instead of a liquid culture media. Solid culture media have the advantage of being able to easily discern the effectiveness, particularly for fungicides.

The desired test concentrations were prepared by mixing specific amounts of the substance solutions of suitable concentrations with specific amounts of liquid bouillon or beerwort agar, in sterile petri-dishes. The amounts, measured with a pipette, of the substance solutions were a maximum of 0.1 to 1 ml. and the total volume in the petri-dishes after admixing with the culture media amounted to 10 ml.

After solidification of the culture media, its surface was inoculated with the test germ suspension in bouillon or wort, which contained about $10^8$ germs per ml. The incubation took place at 30° C. in the incubator, and lasted 21 days when Epidermophyton Kaufmann-Wolf and the other fungi were used. The duration of incubation of 21 days for the fungi was chosen to conform to the above standard test, because in the evaluation of disinfectants against fungi of the epithelium a substance is considered as suitable when the growth of the fungi after predetermined duration of action is delayed by at least 21 days. Therefore, it was ascertained which of the substance concentrations worked into the culture media was just about capable to arrest the growth of the test germs completely. This value thus ascertained was indicated as threshold concentration. The tests were carried out in varying concentration intervals.

In the tests, the threshold concentration of the said esters were composed with that of the diacetate of propanediol-1,2. The results of the tests are shown in Table I. In the table — means no growth and + means growth.

TABLE I
Epidermophyton Kaufmann-Wolf

| Compound | Concentration in p.p.m. | Growth after 21 days |
|---|---|---|
| Diacetate of propanediol-1,2 | 5,000 | — |
| | 3,000 | — |
| | 1,000 | + |
| | 750 | + |
| Example I | 10 | — |
| | 5 | — |
| | 1 | — |
| | 0.5 | + |
| Example II | 3,000 | — |
| | 1,000 | — |
| | 750 | + |
| | 500 | + |
| Example III | 500 | — |
| | 250 | — |
| | 100 | + |
| | 50 | + |
| | 25 | + |

Table I shows that the inhibiting concentration of the diacetate of propanediol-1,2 is 0.3% as compared to the inhibiting concentration of 0.0001% of the diacetate of 2,2,4-trimethylpentanediol-1,3 which is 3000 times more effective.

EXAMPLE V

Using the procedure of Example IV, additional tests were conducted with a number of fungi which tests are reported in Tables II to V.

TABLE II
Trichophyton mentagrophytes

| Compound | Concentration in p.p.m. | Growth after 21 days |
|---|---|---|
| Example I | 3,000 | — |
| | 1,000 | — |
| | 750 | + |
| | 500 | + |
| Example II | 3,000 | — |
| | 1,000 | — |
| | 750 | + |
| | 500 | + |
| Example III | 5,000 | — |
| | 3,000 | — |
| | 1,000 | + |
| | 750 | + |

TABLE III
Trichophyton rubrum

| Compound | Concentration in p.p.m. | Growth after 21 days |
|---|---|---|
| Example I | 500 | — |
| | 250 | — |
| | 100 | + |
| | 50 | + |
| Example II | 3,000 | — |
| | 1,000 | — |
| | 750 | + |
| | 500 | + |
| Example III | 5,000 | — |
| | 3,000 | — |
| | 1,000 | + |
| | 750 | + |

TABLE IV
Epidermophyton floccosum

| Compound | Concentration in p.p.m. | Growth after 21 days |
|---|---|---|
| Example I | 500 | — |
| | 250 | — |
| | 100 | + |
| | 50 | + |
| | 10 | — |
| Example II | 5 | — |
| | 2.5 | — |
| | 1 | + |
| | 0.5 | + |
| Example III | 250 | — |
| | 100 | — |
| | 50 | + |
| | 25 | + |

TABLE V
Microsporium gypseum

| Compound | Concentration in p.p.m. | Growth after 21 days |
|---|---|---|
| Example I | 750 | — |
| | 500 | — |
| | 250 | + |
| | 100 | + |
| Example II | 3,000 | — |
| | 1,000 | — |
| | 750 | + |
| | 500 | + |
| Example III | 5,000 | — |
| | 3,000 | — |
| | 1,000 | + |
| | 750 | + |

Tables II to V clearly demonstrate that the 1,3-dialkanoyl esters of 2,2,4-trimethylpentanediol-1,3 are effective fungicides with the diacetate ester having the greatest antifungal activity.

Pharmaceutical compositions (A) An antimycotic solution was prepared by dissolving 0.125 part by weight in 50 parts by weight of dilute alcohol.

(B) Antimycotic ointments were prepared by dispersing 0.5 part by weight of diacetate of 2,2,4-trimethylpentanediol-1,3 in 100 parts by weight of Vaseline, a 1:1 mixture of Polyethyleneglycol 300 and Polyethyleneglycol 1500 and lanolin ointment base, respectively.

(C) An antimycotic powder was prepared from 1.0 part by weight of the diacetate of 2,2,4-trimethylpentanediol-1,3 and 100 parts by weight of powdered talc.

In the above compositions, all or part of the diacetate ester could be replaced with varying amounts of other dialiphatic carboxylic acid esters of 2,2,4-trimethylpentanediol-1,3. The said compositions have the advantage of being highly effective against fungi even in small amounts sufficient to prevent the growth of fungi without danger to the skin.

Various modifications of the compositions and method of the invention may be made without departing from the spirit or scope thereof and it is to be understood that the invention is to be limited only as defined in the appended claims.

We claim:
1. A method of killing fungi which comprises applying to fungi an amount effective for killing fungi of the diester of 2,2,4-trimethylpentanediol - 1,3 and alkanoic acid of 2 to 12 carbon atoms.

2. A method of claim 1 wherein the diester is the dipropionate of 2,2,4-trimethylpentanediol-1,3.

3. A method of claim 1 wherein the diester is the dibutyrate of 2,2,4-trimethylpentanediol-1,3.

4. The method of claim 1 wherein the diester is the diacetate of 2,2,4-trimethylpentanediol-1,3.

References Cited

Seneca et al., Antimicrobial Agents and Chemotherapy, 1961, pages 807–810.

Leiter et al., Cancer Research, vol. 19, No. 6, part 2, July 1959, pages 309–315 and 370 (No. 15077).

JEROME D. GOLDBERG, Primary Examiner